US011079030B2

United States Patent
Pilotte et al.

(10) Patent No.: US 11,079,030 B2
(45) Date of Patent: Aug. 3, 2021

(54) THREE POSITION CHECK VALVES FOR USE WITH VACUUM JAMMED FILM ENVELOPES

(71) Applicants: Mary Pilotte, West Lafayette, IN (US); Regina Pilotte, West Lafayette, IN (US); Geza Lanczy, West Lafayette, IN (US)

(72) Inventors: Mary Pilotte, West Lafayette, IN (US); Regina Pilotte, West Lafayette, IN (US); Geza Lanczy, West Lafayette, IN (US)

(*) Notice: Subject to any disclaimer, the term of this patent is extended or adjusted under 35 U.S.C. 154(b) by 57 days.

(21) Appl. No.: 16/503,433

(22) Filed: Jul. 3, 2019

(65) Prior Publication Data
US 2021/0003227 A1    Jan. 7, 2021

(51) Int. Cl.
*F16K 15/18* (2006.01)
*F16K 27/02* (2006.01)
*F16K 31/60* (2006.01)

(52) U.S. Cl.
CPC ........ *F16K 15/185* (2013.01); *F16K 27/0209* (2013.01); *F16K 27/0236* (2013.01); *F16K 31/602* (2013.01); *Y10T 137/3584* (2015.04)

(58) Field of Classification Search
CPC ............... F16K 15/185; F16K 27/0209; F16K 27/0236; F16K 31/602; F16K 15/20; F16K 31/067; F16K 31/5288; F16K 35/04; F16K 15/18; F16K 15/06; Y10T 137/3709; Y10T 137/3584
USPC .. 137/523, 315.39, 315.36, 315.4, 530, 223, 137/230; 251/82, 83, 251; 220/902
See application file for complete search history.

(56) References Cited

U.S. PATENT DOCUMENTS

| 4,015,622 A * | 4/1977 | Pagani ...................... B63C 9/24 |
| | | 137/223 |
| 4,640,080 A | 2/1987 | Wright |
| 4,657,003 A | 4/1987 | Wirtz |
| 5,246,114 A | 9/1993 | Underwood |
| 5,272,856 A | 12/1993 | Pharo |
| 5,308,075 A * | 5/1994 | Theriault ........... A63B 69/3652 |
| | | 29/773 |
| 5,316,149 A | 5/1994 | Tate |
| 5,351,830 A | 10/1994 | Bender et al. |
| 5,515,975 A | 5/1996 | Jarvis et al. |
| 5,788,078 A | 8/1998 | Fuss |
| 5,826,404 A | 10/1998 | Fuss et al. |
| 5,871,031 A | 2/1999 | Greinacher |
| 5,893,461 A | 4/1999 | Walters |

(Continued)

FOREIGN PATENT DOCUMENTS

CN        102596750 B    7/2014

*Primary Examiner* — Craig J Price
*Assistant Examiner* — Andrew J Rost
(74) *Attorney, Agent, or Firm* — Gutwein Law; Greg N. Geiser

(57) ABSTRACT

The present disclosure relates to a three-function check valve that in one embodiment is attached to a vacuum bladder full of media (foam beads). This three-function check valve is comprised of a selection piece, silicone membrane, and a mounting base all in one sub-assembly. Furthermore, this valve has three positions with three distinct functions. These functions are to create an airtight seal, allow for free flow in and out of the bladder, and restrict flow of air based on a differential pressure.

19 Claims, 18 Drawing Sheets

Exploded view of three-way valve

(56) References Cited

U.S. PATENT DOCUMENTS

| | | | |
|---|---|---|---|
| 5,948,013 A * | 9/1999 | Swezey | A61F 7/10 607/108 |
| 6,085,909 A | 7/2000 | Lyons | |
| 6,358,459 B1 | 3/2002 | Ziegler et al. | |
| 6,622,749 B2 * | 9/2003 | Li | F16K 15/20 137/223 |
| 6,648,004 B2 * | 11/2003 | Lau | F16K 15/148 137/223 |
| 6,656,143 B2 | 12/2003 | Browd | |
| 7,066,442 B2 * | 6/2006 | Rose | F16K 15/20 137/223 |
| 7,121,302 B2 * | 10/2006 | Hwang | A47C 27/081 137/599.18 |
| 7,273,065 B1 * | 9/2007 | Robbins | F16K 15/205 137/223 |
| 7,434,594 B1 * | 10/2008 | Robbins | F16K 15/205 137/223 |
| 7,997,296 B2 * | 8/2011 | Teng | F16K 15/20 137/226 |
| 8,011,511 B2 | 9/2011 | Oyler et al. | |
| 9,121,519 B2 * | 9/2015 | Wang | F16K 15/20 |
| 9,834,361 B2 * | 12/2017 | Baker | A45C 7/0081 |
| 2002/0117421 A1 | 8/2002 | Baker | |
| 2003/0015452 A1 * | 1/2003 | Su | B65D 81/2038 206/524.8 |
| 2009/0188045 A1 * | 7/2009 | Anikin | B60N 2/62 5/654 |
| 2009/0189432 A1 * | 7/2009 | Anikin | A47C 27/088 297/423.41 |
| 2010/0096572 A1 * | 4/2010 | Teng | F16K 15/20 251/93 |
| 2010/0154897 A1 * | 6/2010 | Wu | F16K 15/202 137/223 |
| 2011/0139668 A1 | 6/2011 | Baker | |
| 2012/0187015 A1 | 7/2012 | Kasiwabara et al. | |
| 2012/0285552 A1 * | 11/2012 | Song | F16K 15/20 137/223 |

* cited by examiner

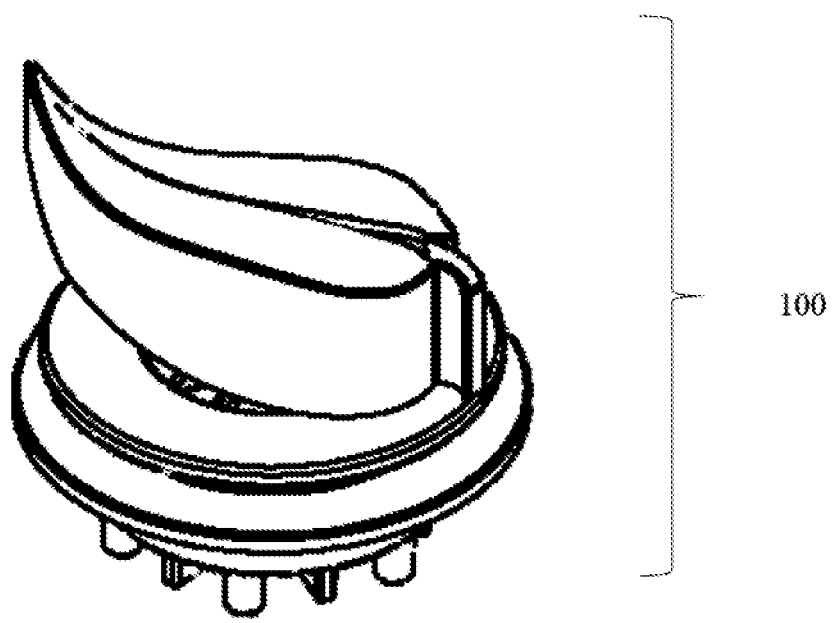
Figure 1. Three-way valve fully assembled

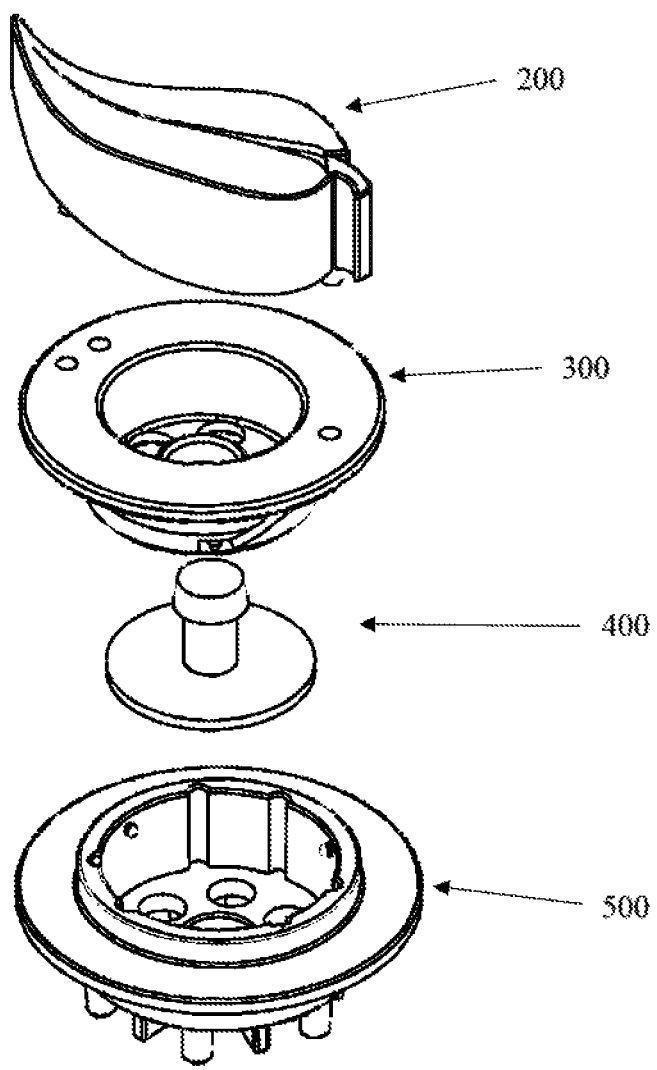
Figure 2. Exploded view of three-way valve

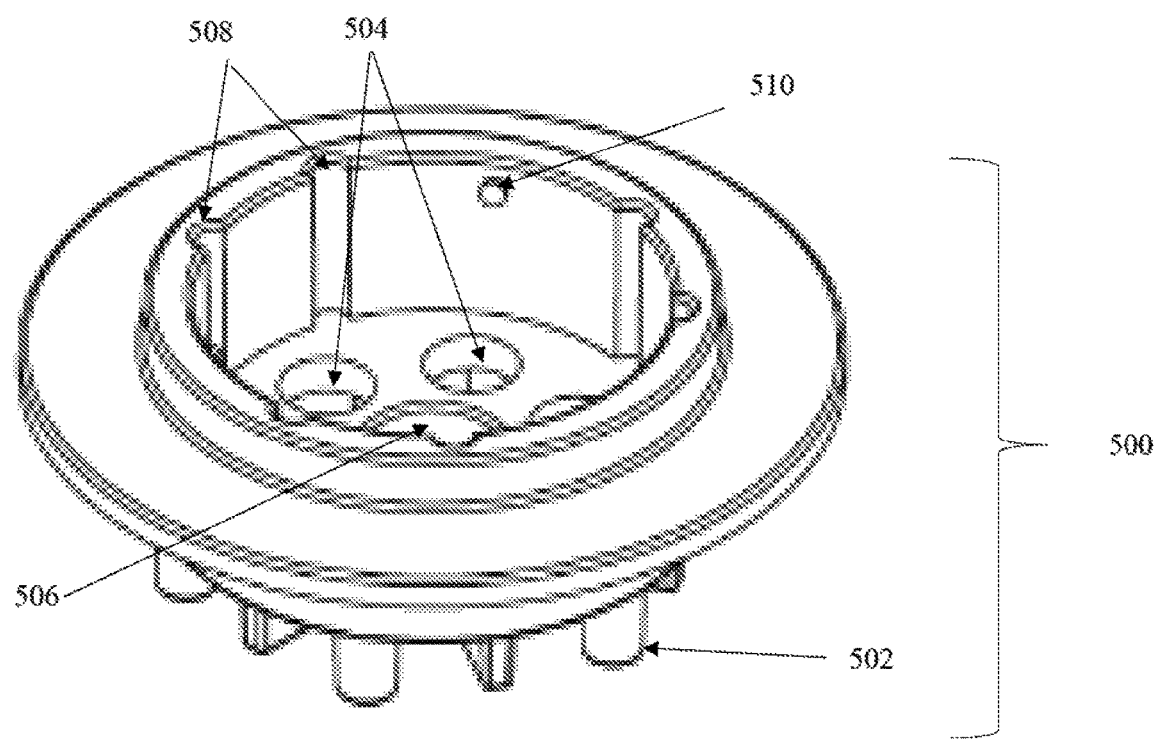
Figure 3A: Front view of one possible design for a valve base plate

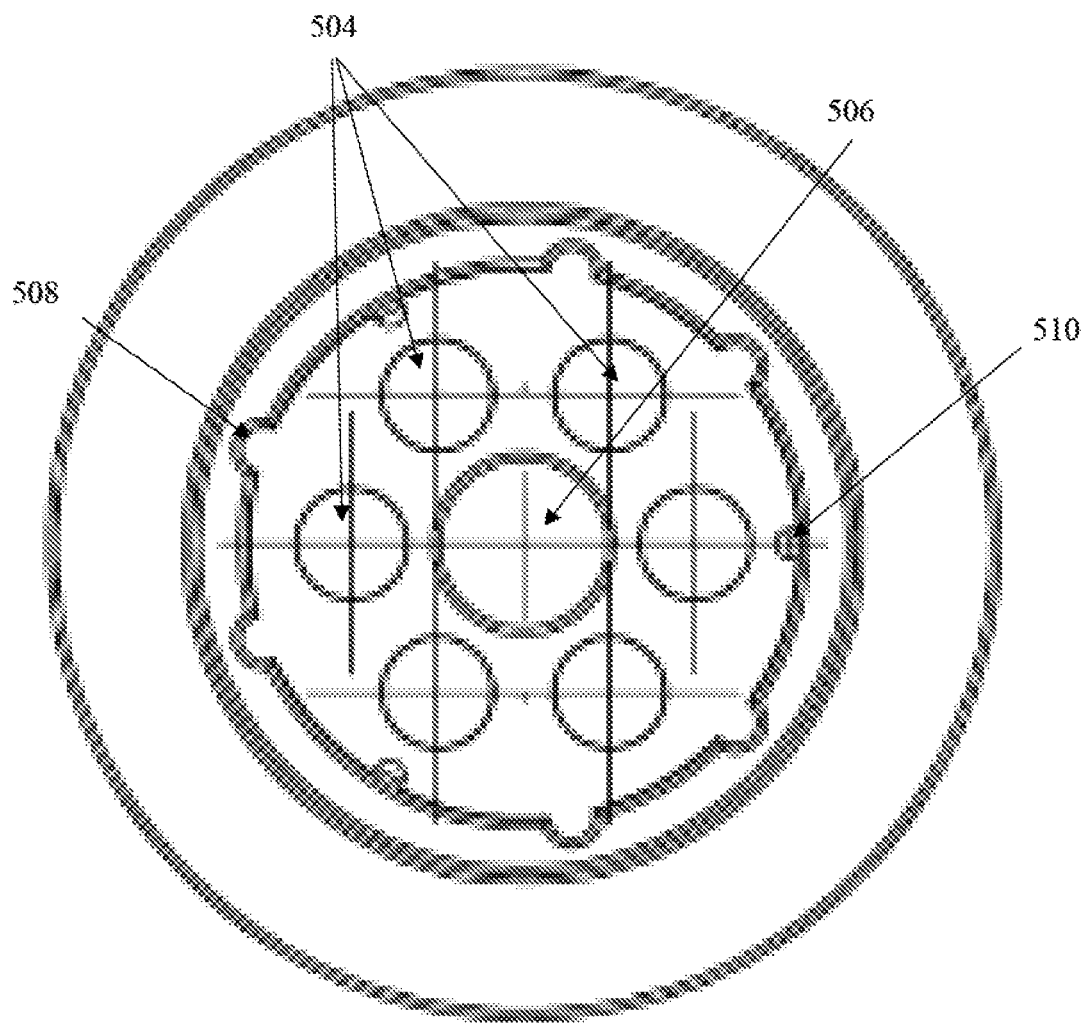
Figure 3B: Top view of one possible design for a valve base plate

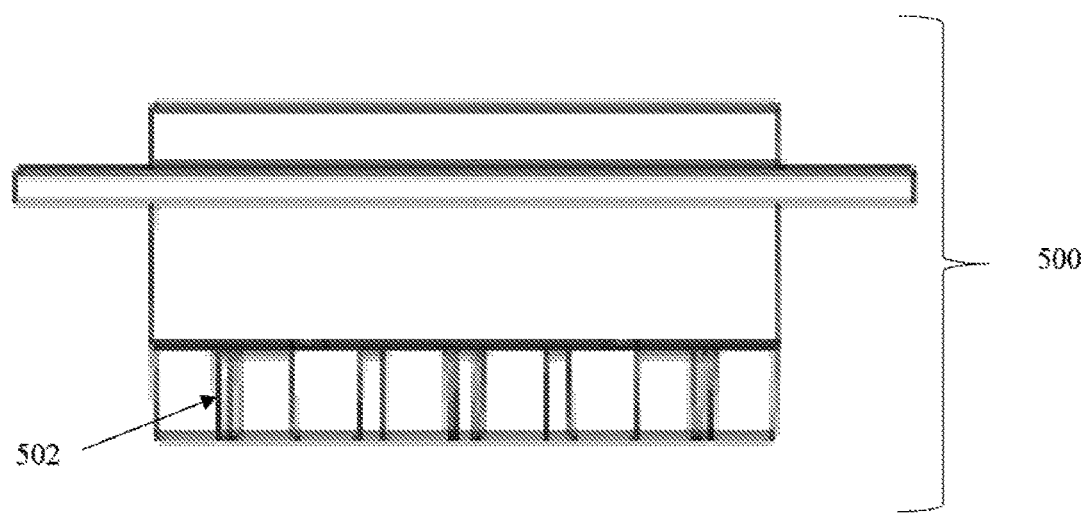
Figure 3C: Side view of one possible design for a valve base plate

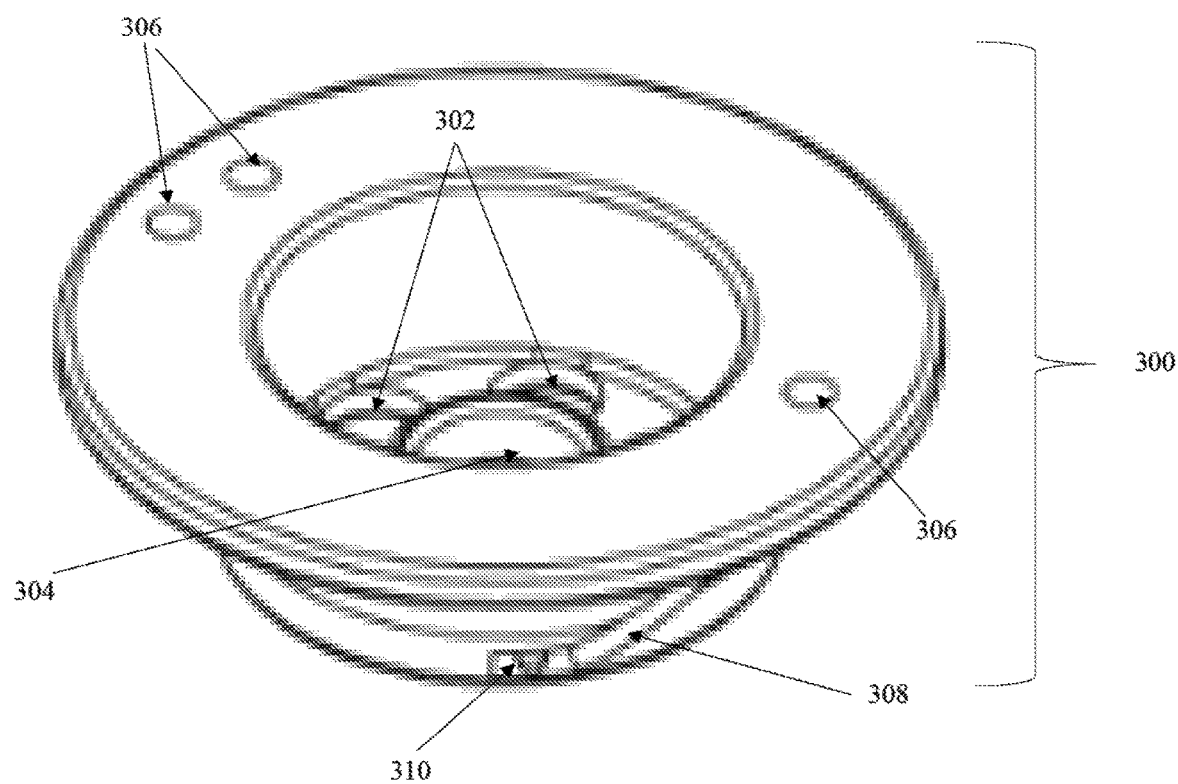
Figure 4A: Front view of one possible design for a valve cap

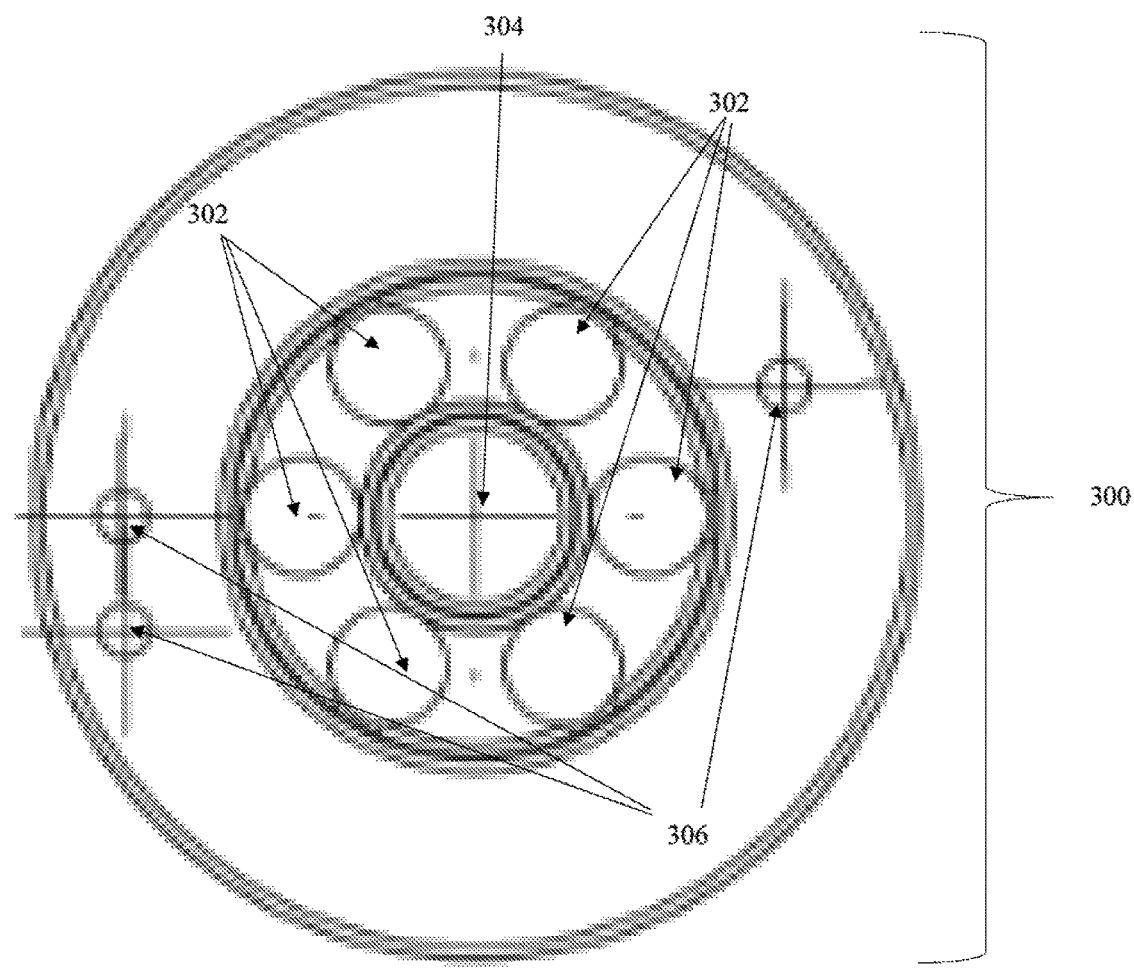
Figure 4B: Top view of one possible design for a valve cap

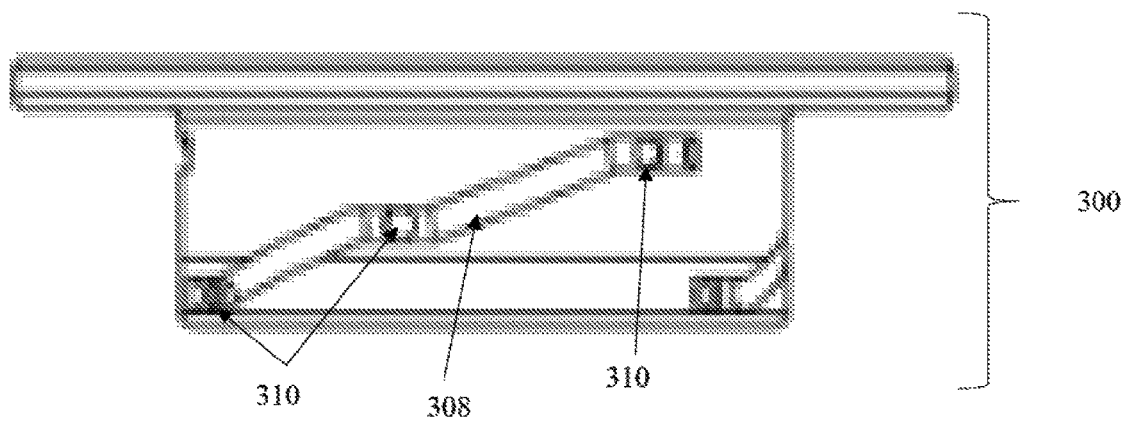
Figure 4C: Side view of one possible design for a valve cap

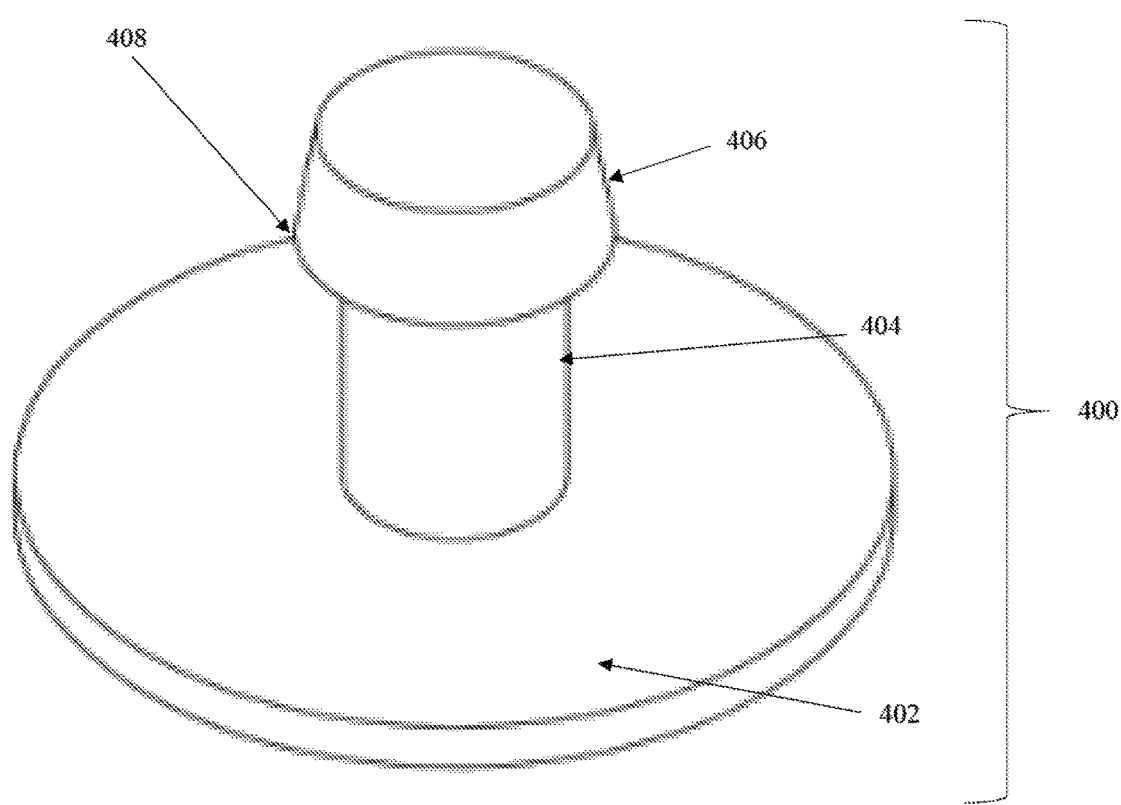
Figure 5: One possible design for a silicone membrane

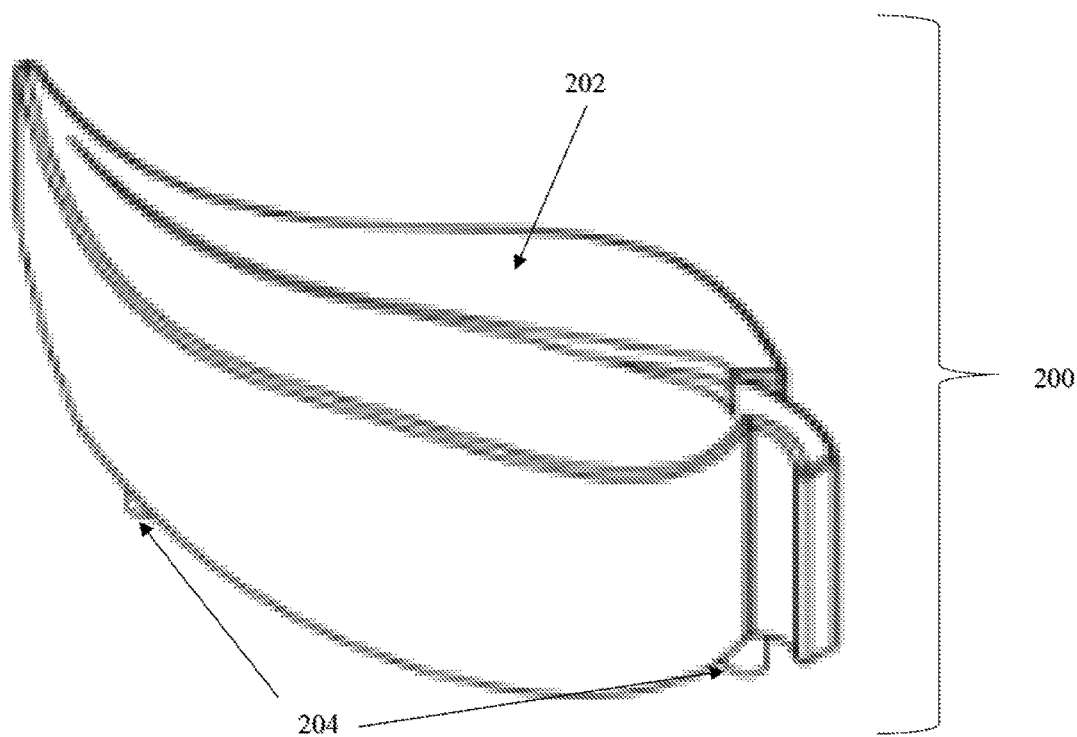
Figure 6A: Front view of one possible design of the valve handle
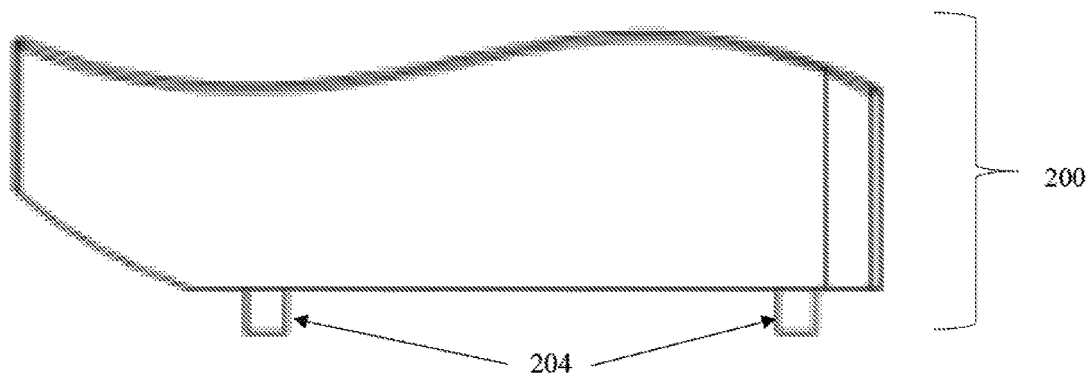
Figure 6B: Side view of one possible design of valve handle

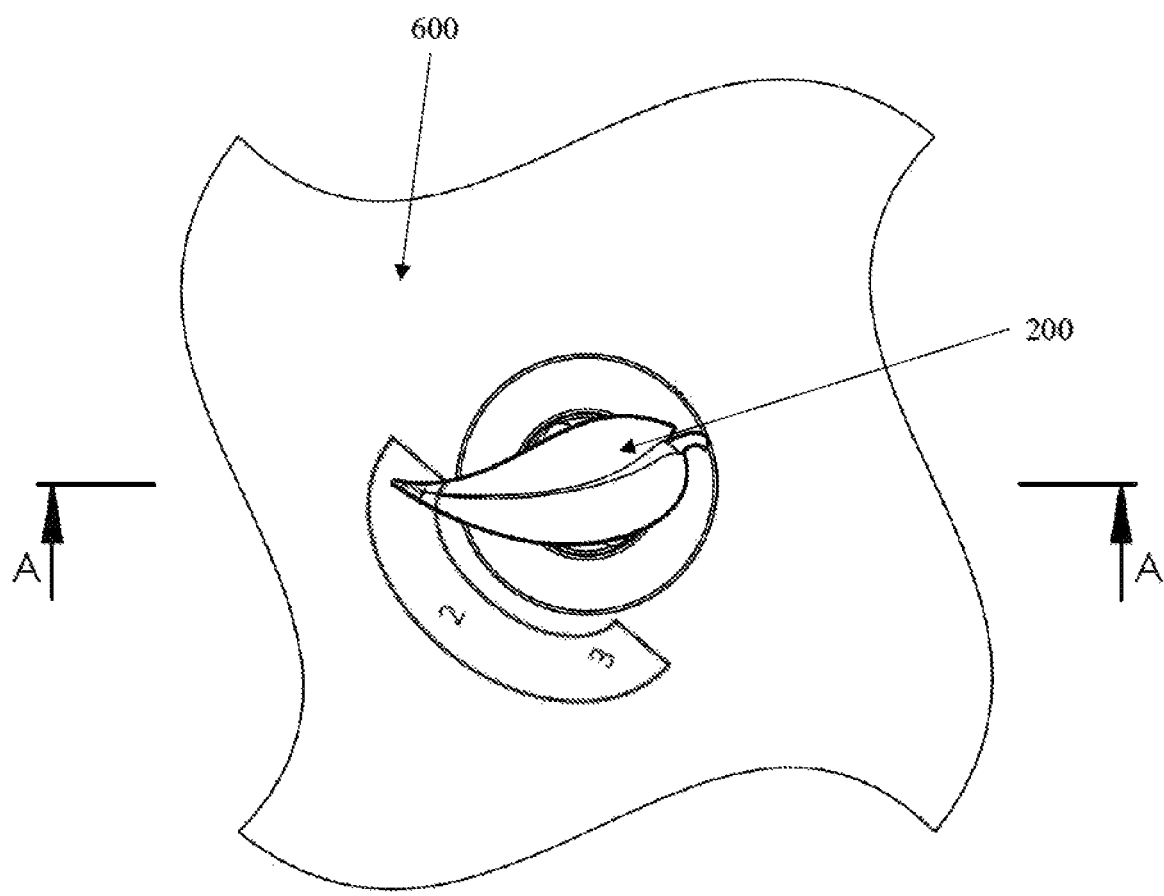
Figure 7. Top view of three-way check valve in position one

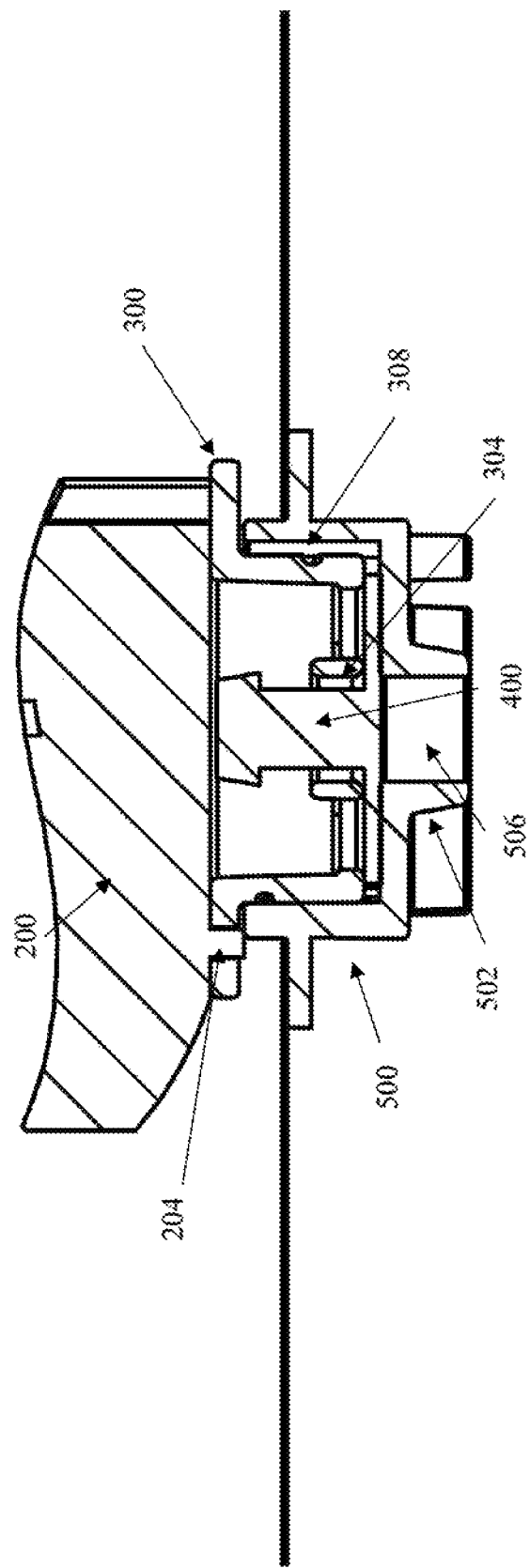
Figure 8. Cross sectional view of three-way check valve in position one

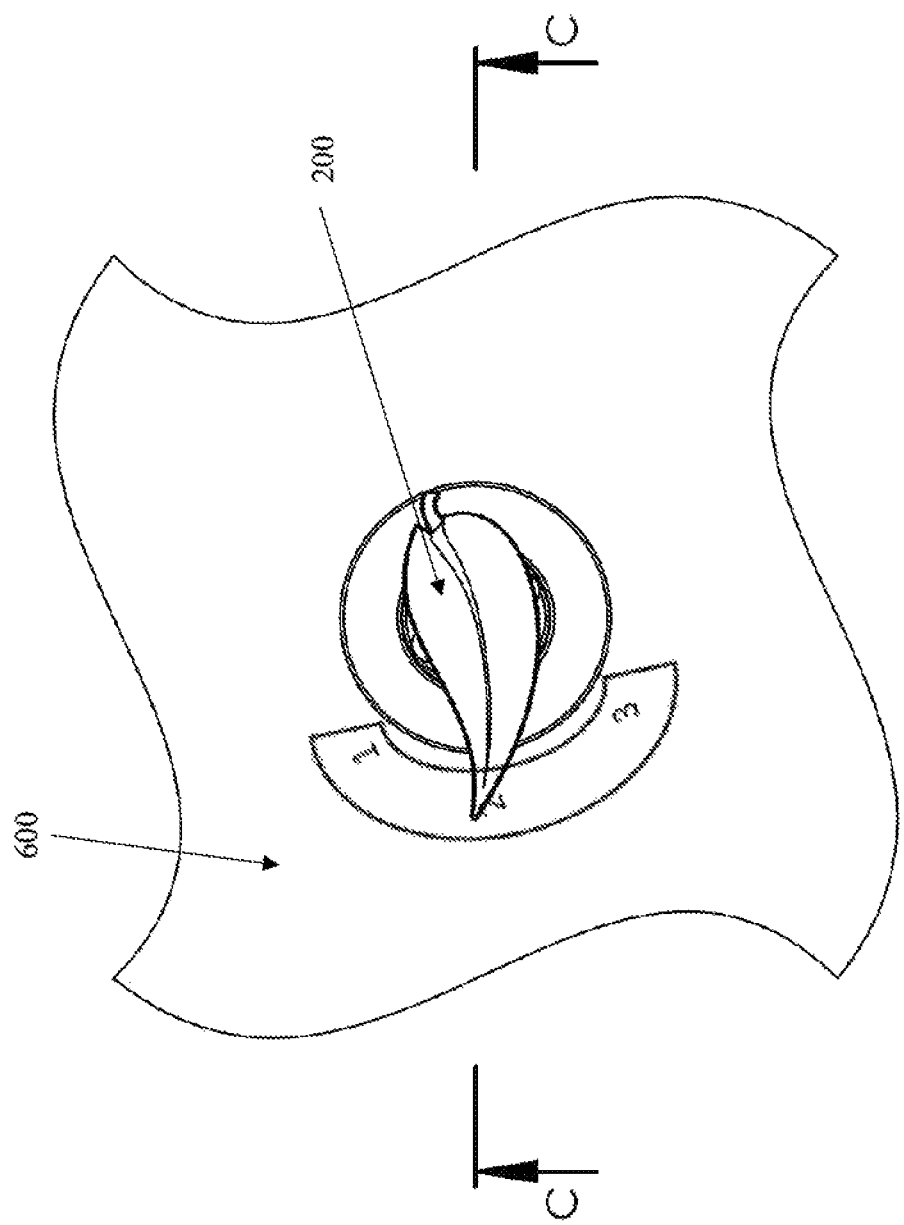
Figure 9. Top view of three-way check valve in position two

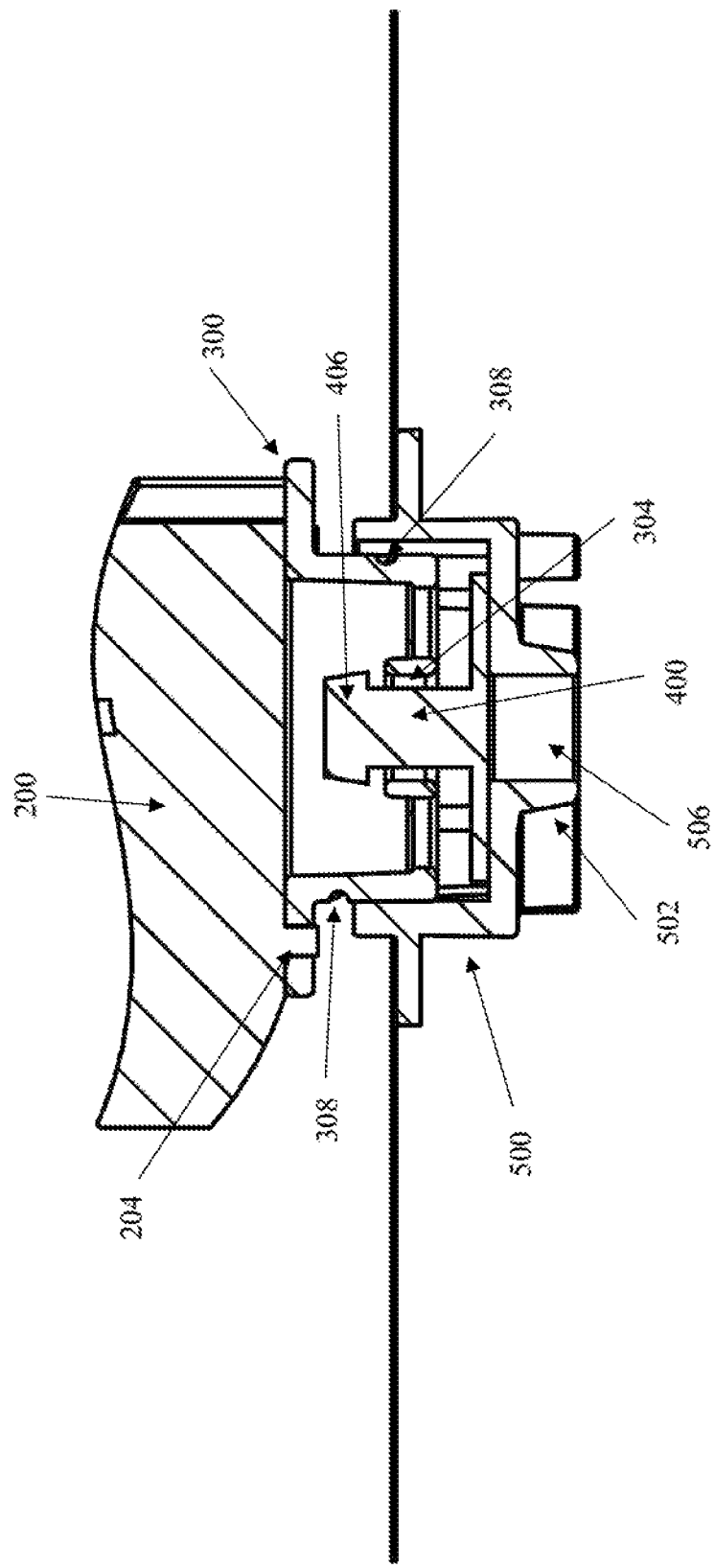
Figure 10. Cross sectional view of three-way check valve in position two

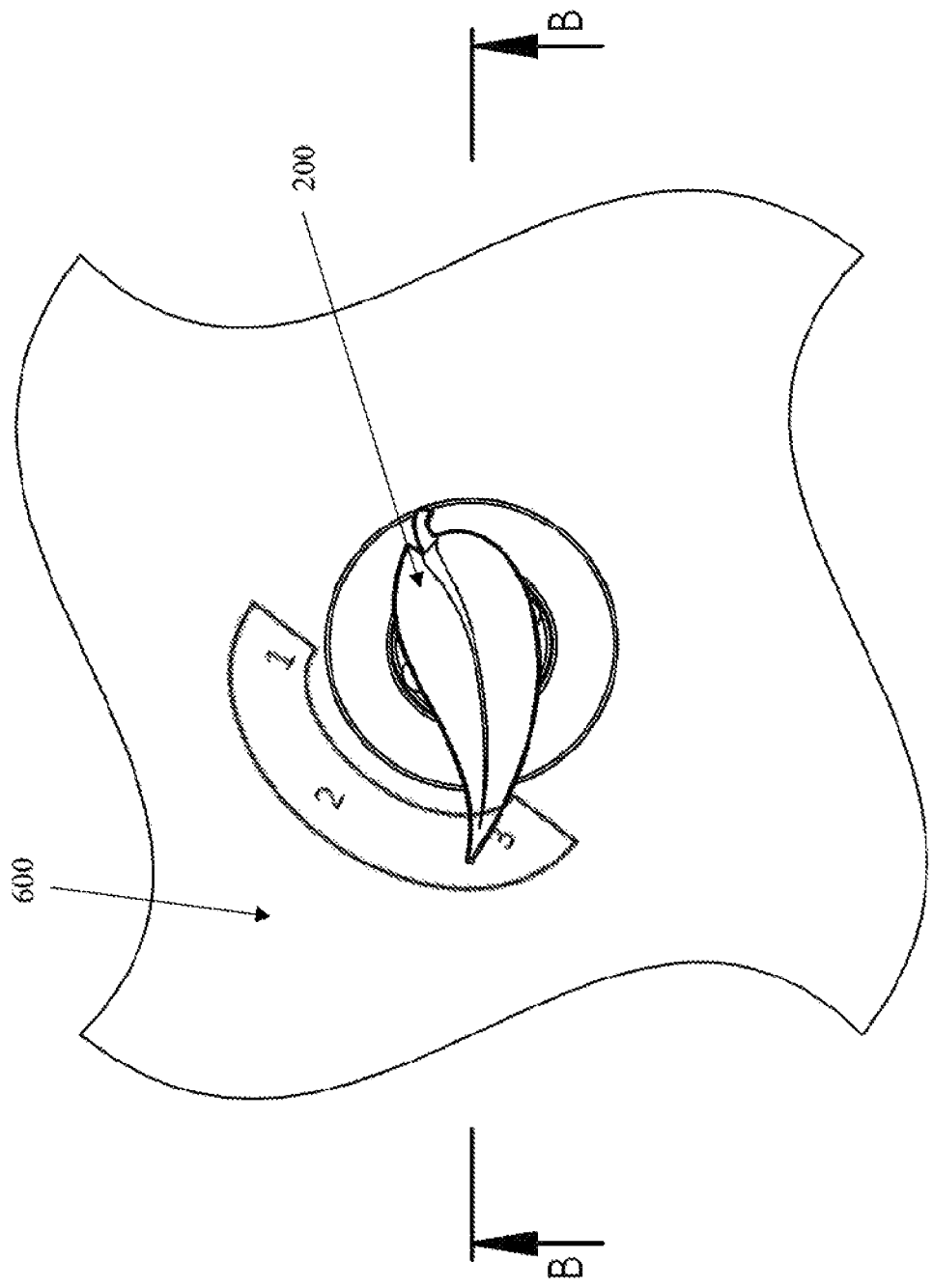
Figure 11. Top view of three-way check valve in position three

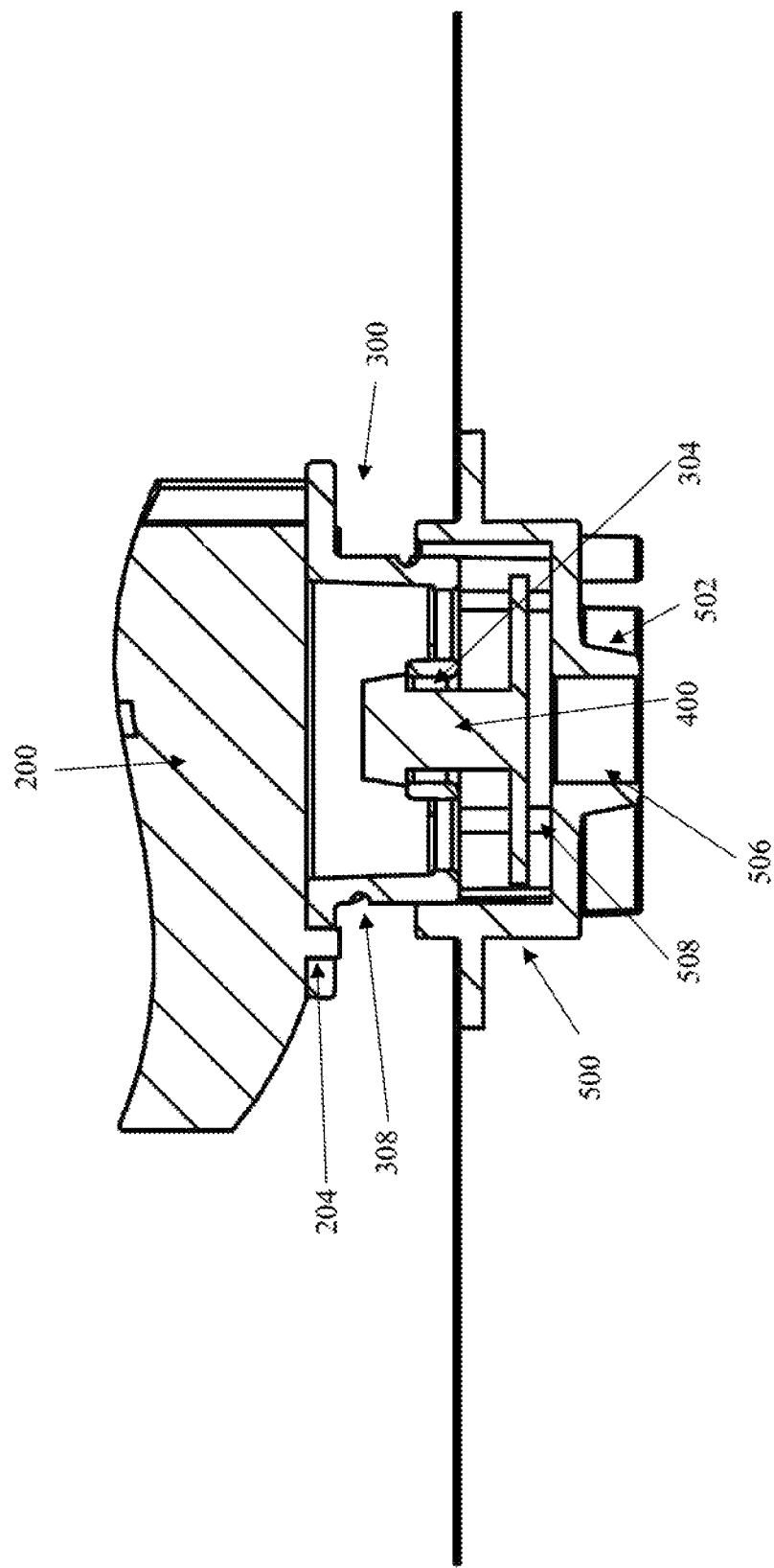
Figure 12. Cross Sectional view of three-way check valve in position three

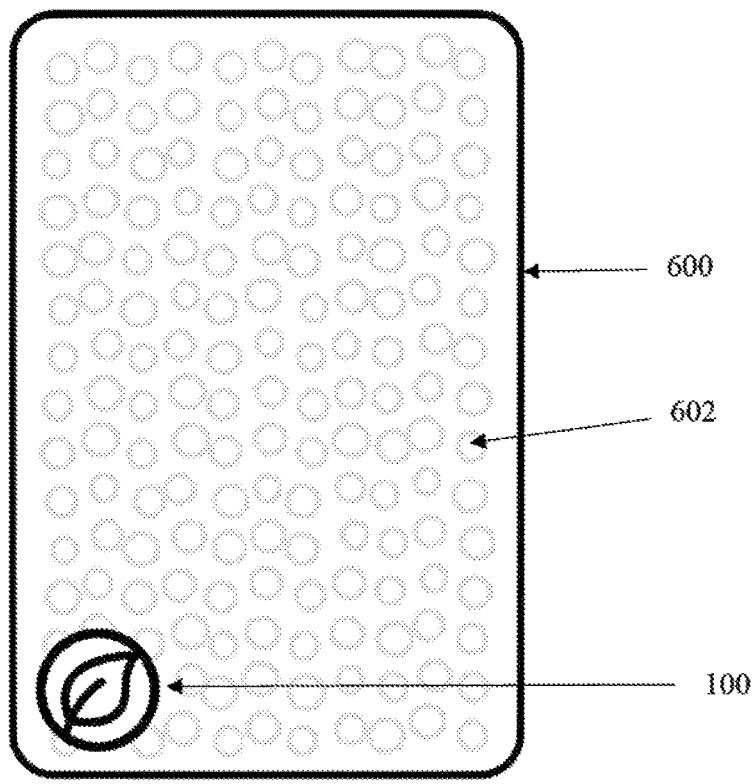
Figure 13. Three-way check valve attached to vacuum bladder filled with internal jamming.

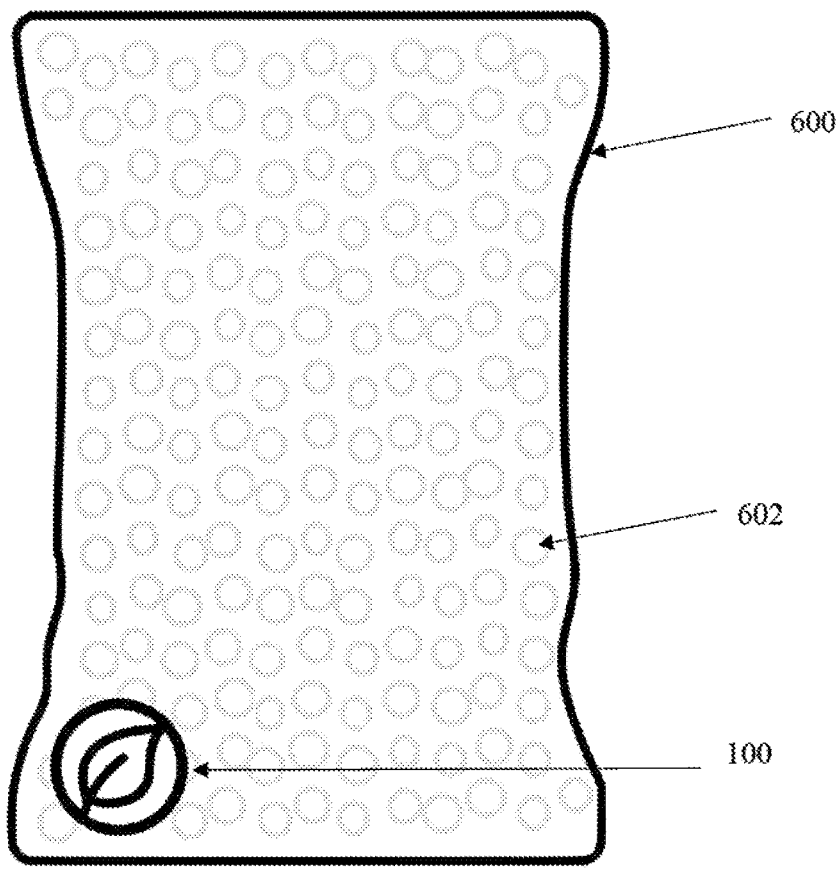
Figure 14. Three-way check valve attached to vacuum bladder filled with internal jamming (compressed).

THREE POSITION CHECK VALVES FOR USE WITH VACUUM JAMMED FILM ENVELOPES

FIELD

The disclosure relates to a three-function valve for use with jammed fill for packaging, medical applications and other uses.

BACKGROUND

Valves are used to direct or control flow of solid, liquid, gaseous or supercritical matter. One valve can perform numerous functions such as stop flow, freely allow flow in two directions or allow flow in only one direction. A two-function valve can perform two different functions such as stop flow and allow flow in only one direction between two areas separated by the valve, for instance the inside and outside of a bag or container or opposite sides of a filter or membrane. However, many instances occur where a three-function valve is required.

U.S. Pat. No. 6,656,143 describes a vacuum fixation device to provide semi-rigid head fixation during medical operations. This device has a port that connects to the vacuum bag that lets air in or out of the bag while also being closeable by a seal. Furthermore, this vacuum bag has foam bead inside to function as cushion.

U.S. Pat. No. 5,246,114 describes a collapsible vacuum bag for preserving packaging during storage. In one embodiment the collapsible bag has two separate valves, one to inject air and one that functions as a vacuum valve.

U.S. Pat. No. 5,893,461 describes a flexible package device that contains a vacuum bag with a valve with three settings for ventilation of gasses. The first is an airtight seal, the second setting is a transitory phase between first and third setting wherein a small amount of ambient air enters the package, and the third setting acts as a venting phase wherein any gas inside the package may vent but ambient air cannot enter. However, this does not allow for controllability by the end user, it is designed and controlled to be managed by an automated manufacturing process at a factory.

U.S. Pat. No. 5,871,031 A describes a removeable three position valve for regulating fluid flow comprising a collar, plug, and a flapper seal among other components. The plug is moveable between three positions to be completely sealed, allow 1-way flow, and finally to allow 2-way flow. This technology is designed to function with a positively pressurized bladder and requires tools to switch between the three positions.

SUMMARY

The three-function valve of this disclosure performs the following: seals off internal bag contents from external environment, allows free air flow in both directions across bag wall, and is a check valve to allow air to travel in only one direction.

In one aspect of the disclosure, the three-function valve contains three pieces in one subassembly, a twisting piece with unique geometry, a flexible silicone membrane, and a mounting base valve seat.

A check valve device comprising a selection piece, a flexible membrane, and a mounting base, wherein the mounting base includes projections to prevent the internal jamming media from blocking the flow of air or other fluid through the check valve device, wherein the base defines a plurality of small holes and at least one larger hole in the center of the base, wherein the base also defines a plurality of semicircle grooves running the height of the wall of the base, wherein the base includes circular ridge, wherein the selection piece defines a plurality of detent positions of a stepped track, the plurality of detent positions of the stepped track configured to engage circular ridge to lock selection piece into three different positions relative to the base, wherein twisting the selection piece causes the circular ridge of the base to move within the stepped track, where the selection piece translates relative to the base until the circular ridge engages at least one of the plurality of detent positions, wherein the flexible membrane includes a wide, thin circular piece, a smaller cylindrical piece centered on the thin circular piece, and a short, trapezoidal top, wherein the smaller cylindrical piece is sized to fit within the center hole, wherein the wide, thin circular piece functions to aid in creating an airtight seal when the check valve device is in one of the three different positions.

In a further aspect of the disclosure, the three-function check valve is attached to a vacuum bladder with internal jamming, possibly foam beads.

In another aspect of the disclosure, the valve has critical projections that face down into the bladder to prevent any chance of valve blockage by the internal jamming.

In additional aspects of the disclosure, the device is designed for use as flexible packaging.

In another aspect of the disclosure, the device is designed for a medical device application.

The ability to achieve these three unique conditions with the use of a single three-piece assembly that is configured in this manner, is novel. This device allows for user moderated flow management as a single assembly, rather than independent components that can be lost. Furthermore, this device does not require an additional return valve or the use of any tools to executes its full three condition functionality.

BRIEF DESCRIPTION OF THE DRAWINGS

The above-mentioned and other features of this disclosure, and the manner of attaining them, will become more apparent and the disclosure itself will be better understood by reference to the following description of embodiments of the disclosure taken in conjunction with the accompanying drawings, wherein:

Unless otherwise stated, a reference to a compound or component includes the compound or component by itself, as well as in combination with other compounds or components, such as mixtures of compounds.

As used herein, the singular forms "a", "an" and "the" include the plural reference unless the context clearly dictates otherwise.

All publications, patents and patent applications cited herein, whether supra or infra, are hereby incorporated by reference in their entirety to the same extent as if each individual publication, patent or patent application was specifically and individually indicated to be incorporated by reference.

FIG. 1 illustrates a perspective view of a fully assembled three-way valve as an embodiment of the present disclosure.

FIG. 2 shows an exploded view of the three-way valve as shown in FIG. 1.

FIG. 3A illustrates one possible design for a valve base plate from a front perspective.

FIG. 3B illustrates one possible design for a valve base plate from a top perspective.

FIG. 3C illustrates one possible design for a valve base plate from a side perspective.

FIG. 4A illustrates one possible design for a valve cap from a front perspective.

FIG. 4B illustrates one possible design for a valve cap from a top perspective.

FIG. 4C illustrates one possible design for a valve cap from a side perspective.

FIG. 5 illustrates one possible design for a silicone membrane from a front perspective.

FIG. 6A illustrates one possible design for the valve handle from a front perspective.

FIG. 6B illustrates one possible design for the valve handle from a side perspective.

FIG. 7 provides a top view of the fully assembled three-way valve in position one according to another embodiment of the present disclosure.

FIG. 8 provides a cross sectional view of the fully assembled three-way valve as shown in FIG. 7.

FIG. 9 provides a top view of the fully assembled three-way valve shown in FIG. 7 in position two.

FIG. 10 provides a cross sectional view of the fully assembled three-way valve as shown in FIG. 9.

FIG. 11 provides a top view of the fully assembled three-way valve shown in FIG. 7 in position three.

FIG. 12 provides a cross sectional view of the fully assembled three-way valve as shown in FIG. 11.

FIG. 13 provides a 2D view of the fully assembled three-way valve as shown in FIG. 1, attached to a vacuum bladder filled with internal jamming.

FIG. 14 provides a 2D view of the fully assembled three-way valve as shown in FIG. 1, attached to a vacuum bladder filled with internal jamming that is compressed.

Corresponding reference characters indicate corresponding parts throughout the several views. Although the drawings represent embodiments of the present disclosure, the drawings are not necessarily to scale and certain features may be exaggerated in order to better illustrate and explain the present disclosure.

DETAILED DESCRIPTION OF THE EXEMPLARY EMBODIMENTS

The embodiments disclosed below are not intended to be exhaustive or limit the disclosure to the precise forms disclosed in the following detailed description. Rather, the embodiments are chosen and described so that others skilled in the art may utilize their teachings.

Referring to FIGS. 1 and 2, a three-function check valve 100 is disclosed that comprises three main pieces. These pieces include, a valve position selection piece 200 with unique geometry, a silicone membrane 400, and a mounting valve seat base 500. This device allows an end user to quickly and easily switch between the three functions via twisting the selection piece 200 with no need for additional tools.

FIGS. 3A, 3B, and 3C illustrate one possible design for a valve seat base 500 in three different perspectives, front, top, and side, respectively. Valve seat base 500 can be made of numerous materials but in a preferred embodiment is made of environmentally friendly materials. In FIG. 3A, projections 502 are shown. The projections 502 seen facing down and can be effectively utilized within the vacuum bladder 600, as shown in FIGS. 13 and 14, to prevent the internal jamming media 602 from blocking the flow of air or other fluid through the check valve device 100. These projections 502 can be various sizes and dimensions as long as the desired outcome of preventing the internal jamming media 602 from blocking the check valve device 100 is achieved. Valve seat base 500 defines six small holes 504 and the larger center hole 506 shown in the top view of FIG. 3B. Holes 504 and 506 efficiently allow for air or other fluid to flow through the check valve device 100 under the correct position. FIGS. 3A and 3B also show semicircle grooves 508 and circular ridge 510. The circular ridges 510 act as position lock for the check valve device 100 in the three different positions. The detent 310 (FIG. 4A) of the stepped track 308 (FIG. 4A) is "locked" in a position when twisting the selection piece 200 up or down until the circular ridge 510 is reached. To switch positions, the selection piece 200 is twisted and the circular ridge 510 slides along the stepped track 308 up or down until the next detent 310 is reached. The semicircle grooves 508 aid in the sliding of the valve cap 300.

FIGS. 4A, 4B, and 4C illustrate one possible design for a valve cap 300 in three different perspectives, front, top, and side, respectively. Valve cap 300 defines six small holes 302 shown in FIG. 4B. Holes 302 efficiently allow for air or other fluid to flow through the check valve device 100 under the correct position. The center hole 304 of the valve cap 300 is sized to fit the silicone membrane 400 snuggly enough that under certain conditions, an airtight seal is achieved. Under other conditions, the center hole 304 of the valve cap 300 has space between it and the silicone membrane 400 so as air can flow. The valve cap 300 shown in FIGS. 4A, B, C can be made of numerous materials but in a preferred embodiment is made of environmentally friendly materials. The detent 310 of the stepped track 308 on the valve cap 300 is "locked" in a position when twisting the selection piece 200 up or down until the circular ridge 510 is reached. To switch positions, the selection piece 200 is twisted and the circular ridge 510 slides along the stepped track 308 up or down until the next detent 310 is reached. The semicircle grooves 508 aid in the sliding of the valve cap 300.

FIG. 5 illustrates one possible design for a silicone membrane or like property material. This silicone membrane 400 is designed to ultimately be flexible in nature and allow the check valve device 100 to achieve the three different functions. The geometry of the silicone membrane 400 as seen in FIG. 5 is not meant to encompass all possible geometries for this silicone membrane 400. The key features for the silicone membrane 400 to function well include a wide, thin circular piece 402, a smaller cylindrical piece 404 centered onto the thin circular piece 402, and a short, trapezoidal top 406 that has a ridge 408. The wide, thin circular piece 402 functions to aid in creating an airtight seal when the check valve device 100 is in position one. The cylindrical piece 404 functions to attach the trapezoidal top 406 with the thin circular piece 402, as well as to assist in allowing the check valve device 100 to easily switch between the three functions. When the check valve device 100 is switched between functions the silicone membrane 400 moves from a compressed airtight seal to releasing and allowing air to flow through the check valve device 100.

FIGS. 6A and B illustrate one possible design for the valve position selection piece 200 in front and side perspectives. The selection piece 200 shown in FIGS. 6A and 6B includes a unique leaf-shaped geometry 202. This geometry however is designed to match any company logo as long as it facilitates the twisting movement allowing for selection of the desired valve position. Furthermore, this selection piece 200 is designed to utilize eco-friendly materials. The selection piece 200 attaches to the valve cap 300 via the attachment prongs 204 on the selection piece 200 connecting to the three holes for attachment 306 and can rotate piece 300 between the three valve positions.

FIGS. 7 and 8 show position one of the three position check valve in top and cross-sectional views, respectively. As shown in the cross-sectional view of FIG. 8, as the selection piece 200 is twisted to position one, the mechanism compresses the silicone membrane 400 to the valve seat base 500 to mechanically lock the device and create a lasting airtight seal. Mechanical locking occurs as the detent 310 of the stepped track 308 on the valve cap 300 is "locked" in a position when twisting the selection piece 200 down until the last circular ridge 510 of the valve seat base 500 is reached. When mechanically locked as described above, the check valve device 100 stops the flow of air or other fluid from entering or exiting the check valve device 100. This position is especially useful in jamming the internal media, as may be used for packing applications or medical device uses when an airtight seal is desired. In one embodiment, the check valve device 100 in position one, as shown in FIGS. 7 and 8, creates an airtight seal to jam internal jamming media 602 inside a vacuum bladder 600 to conform around fragile cargo.

FIGS. 9 and 10 show position two of the three position check valve in top and side views. When the selection piece 200 is twisted to the neutral position two, the silicone membrane 400 functions as a normal diaphragm check valve. A normal diaphragm check valve is defined as a device with two openings with a diaphragm in between the openings, wherein the flow of fluid is restricted based on a pressure being greater on one side, thus pushing the diaphragm open to relieve the pressure differential. When in position two, the silicone membrane 400 rests freely above the valve seat base 500 and acts as the diaphragm to restrict the flow of air or other fluid inside the vacuum bladder 600 based on a differential pressure. Position two occurs as the detent 310 of the stepped track 308 on the valve cap 300 is "locked" in a position when twisting the selection piece 200 until the middle (of three) circular ridge 510 of the valve seat base 500 is reached.

FIGS. 11 and 12 show the third position for the check valve device in top and side views. Position three occurs when the selection piece 200 is twisted to fully open. This position allows the silicone membrane 400 to be pulled open from its valve seat base 500 allowing free flow of fluid in the vacuum bladder 600 or out of the vacuum bladder 600, acting as its own return valve. Position three occurs as the detent 310 of the stepped track 308 on the valve cap 300 is "locked" in a position when twisting the selection piece 200 until the top (of three) circular ridge 510 of the valve seat base 500 is reached.

FIG. 13 shows the three-piece check valve device 100 attached to a vacuum bladder 600. This vacuum bladder 600 may contain internal jamming media 602 that in one embodiment may include foam beads. When this vacuum bladder 600 is manually compressed, as shown in FIG. 14, via the check valve 100 in position two to allow air to flow out due to the differential pressure created from the compression creating a slight vacuum inside the vacuum bladder 600, the internal jamming media 602 conform and form a semi-rigid barrier around an object to allow for safe packaging. In another embodiment, the air can be released from the vacuum bladder 600 via a vacuum pump. Loose fill packing peanuts can be messy and frequently end up scattered whenever a package is opened. The loose fill can also be dangerous to children and pets. By containing the internal jamming 602 in the vacuum bladder 600 this mess and danger is eliminated or greatly reduced. Furthermore, whereas packing peanuts may not protect as well against irregular shaped objects, the conformity from the internal jamming media 602 in a vacuum bladder 600 allows for increased safety against damage. This compressible vacuum bladder 600 can easily be reused by twisting the selection piece 200 to the open valve to position three to allow air to enter the vacuum bladder 600.

While this disclosure has been described as having an exemplary design, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

What is claimed is:

1. A check valve device comprising:
a selection piece, a flexible membrane, and a mounting base, wherein the mounting base includes projections to prevent an internal jamming media from blocking the flow of air or other fluid through the check valve device, wherein the base defines a plurality of small holes and at least one larger hole in the center of the base, wherein the base also defines a plurality of semicircle grooves running the height of the wall of the base, wherein the base includes a circular ridge,
wherein the selection piece defines a plurality of detent positions of a stepped track, the plurality of detent positions of the stepped track configured to engage the circular ridge to lock the selection piece into three different positions relative to the base, wherein twisting the selection piece causes the circular ridge of the base to move within the stepped track, wherein the selection piece translates relative to the base until the circular ridge engages at least one of the plurality of detent positions,
wherein the flexible membrane includes a wide, thin circular piece, a smaller cylindrical piece centered on the thin circular piece, and a short, trapezoidal top, wherein the smaller cylindrical piece is sized to fit within the center hole, wherein the wide, thin circular piece functions to aid in creating an airtight seal when the check valve device is in one of the three different positions.

2. The check valve device of claim 1, wherein the check valve device provides three different functions with one seal.

3. The check valve of claim 2, wherein the check valve does not require an additional return valve or the use of any tools to execute the three positions.

4. The check valve device of claim 1, wherein the check valve device is all one subassembly.

5. The check valve device of claim 1, wherein the flexible membrane provides an airtight seal relative to the center hole.

6. The check valve device of claim 1, wherein the three positions have three unique functions including, an airtight seal, restriction of flow based on differential pressure, and free flow of fluid in both directions.

7. The check valve of claim 6, wherein the check valve does not require an additional return valve or the use of any tools to execute the three unique functions.

8. The check valve device of claim 1, wherein the three positions are reversible by manually twisting the selection piece.

9. The check valve device of claim 1, wherein the selection piece has a geometry designed to facilitate a twisting movement and to indicate the position of the valve.

10. The check valve device of claim 1, wherein the flexible membrane is a silicone membrane.

11. The check valve device of claim 1, wherein the selection piece and the mounting base are made out of environmentally friendly materials.

12. A check valve device comprising:
a selection piece, a flexible membrane, a mounting base and a vacuum bladder; wherein the mounting base is attached to the vacuum bladder,
wherein the check valve device is all one subassembly, wherein the check valve device has three positions with only one seal,
wherein the mounting base has projections facing into the vacuum bladder,
wherein internal jamming media are inside the vacuum bladder, and wherein the projections within the vacuum bladder prevent the internal jamming media from blocking the flow of air or other fluid through the check valve device.

13. The check valve device of claim 12, wherein the three positions have three unique functions including, an airtight seal, restriction of flow based on differential pressure, and free flow of fluid in both directions.

14. The check valve of claim 13, wherein the check valve does not require an additional return valve or the use of any tools to execute the three unique functions.

15. The check valve device of claim 12, wherein the three positions are reversible by manually twisting the selection piece.

16. The check valve device of claim 12, wherein the selection piece has a geometry designed to facilitate a twisting movement and to indicate the position of the valve.

17. The check valve device of claim 12, wherein the flexible membrane is a silicone membrane.

18. The check valve device of claim 12, wherein the selection piece and the mounting base are made out of environmentally friendly materials.

19. The check valve of claim 12, wherein the internal jamming media are foam beads.

* * * * *